US012585537B2

(12) United States Patent
Jung et al.

(10) Patent No.: US 12,585,537 B2
(45) Date of Patent: Mar. 24, 2026

(54) SYSTEMS AND METHODS FOR VERIFYING DATA IN MEMORY

(71) Applicant: Samsung Electronics Co., Ltd., Suwon-si (KR)

(72) Inventors: Changhee Jung, Lafayette, IN (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 115 days.

(21) Appl. No.: 18/534,458

(22) Filed: Dec. 8, 2023

(65) Prior Publication Data

US 2025/0086053 A1 Mar. 13, 2025

Related U.S. Application Data

(60) Provisional application No. 63/537,407, filed on Sep. 8, 2023.

(51) Int. Cl.
　　*G06F 11/10* (2006.01)
　　*G06F 9/30* (2018.01)
　　*G06F 11/07* (2006.01)
(52) U.S. Cl.
　　CPC ...... *G06F 11/1064* (2013.01); *G06F 9/30043* (2013.01); *G06F 11/0772* (2013.01);
　　　　　　　(Continued)
(58) Field of Classification Search
　　CPC ............ G06F 11/1064; G06F 9/30043; G06F 11/0772; G06F 11/1048; G06F 11/1076; G06F 11/1016
　　　　　　　(Continued)

(56) References Cited

U.S. PATENT DOCUMENTS 7,392,347 B2　6/2008　Briggs
7,437,597 B1　10/2008　Kruckemyer et al.
　　　　　　　(Continued)

FOREIGN PATENT DOCUMENTS

EP　　　3371702 B1　10/2019

OTHER PUBLICATIONS

Yoon, Doe Hyun, et al., "Virtualized and Flexible ECC for Main Memory," Proceedings of the fifteenth International Conference on Architectural support for programming languages and operating systems (ASPLOS), Mar. 2010, pp. 397-408.
　　　　　　　(Continued)

*Primary Examiner* — John J Tabone, Jr.
(74) *Attorney, Agent, or Firm* — Womble Bond Dickinson (US) LLP

(57) ABSTRACT

A system, including: a code cache; and a memory controller connected to the code cache, and configured to: receive a read command to read requested data from a location in primary memory connected to the memory controller over a first interface; read first data stored in the location from the primary memory; read a code corresponding to the requested data associated with the read command from the code cache, or from secondary memory connected to the memory controller over a second interface different from the first interface; perform error detection and/or correction based on the first data and the code; select second data based on a result of the error detection and/or correction; and output the second data for the requested data.

20 Claims, 9 Drawing Sheets

(52) U.S. Cl.
CPC ...... *G06F 11/1016* (2013.01); *G06F 11/1048*
(2013.01); *G06F 11/1076* (2013.01)

(58) Field of Classification Search
USPC ................ 714/766, 764, 768, 773, 799, 800
See application file for complete search history.

(56) References Cited

U.S. PATENT DOCUMENTS

| | | | | |
|---|---|---|---|---|
| 8,640,005 | B2 | 1/2014 | Wilkerson et al. | |
| 8,645,796 | B2 | 2/2014 | Ambroladze et al. | |
| 10,579,464 | B2 * | 3/2020 | Das | G06F 11/1064 |
| 10,678,636 | B2 | 6/2020 | Durham | |
| 2008/0256419 | A1 | 10/2008 | Wojewoda et al. | |
| 2012/0159286 | A1 * | 6/2012 | Koshiyama | G06F 11/1048 |
| | | | | 714/768 |
| 2017/0123897 | A1 * | 5/2017 | Quach | G06F 11/1012 |
| 2022/0004324 | A1 * | 1/2022 | Ballapuram | G06F 3/0655 |
| 2022/0012126 | A1 | 1/2022 | Galbi et al. | |
| 2023/0153200 | A1 * | 5/2023 | Lee | G06F 12/0246 |
| | | | | 714/764 |
| 2025/0086053 | A1 * | 3/2025 | Jung | G06F 9/30043 |

OTHER PUBLICATIONS

Zhang, Chao, et al., "ECC Cache: A Lightweight Error Detection for
Phase-Change Memory Stuck-At Faults," 2020 IEEE/ACM International Conference On Computer Aided Design (ICCAD), Nov.
2020, 9 pages.

* cited by examiner

300

302

LLC writes cache line to memory

304

Memory controller receives the cache line and generates code

306

Memory controller writes the cache line to primary memory and sends acknowledgement to LLC

308

Memory controller writes code to code cache

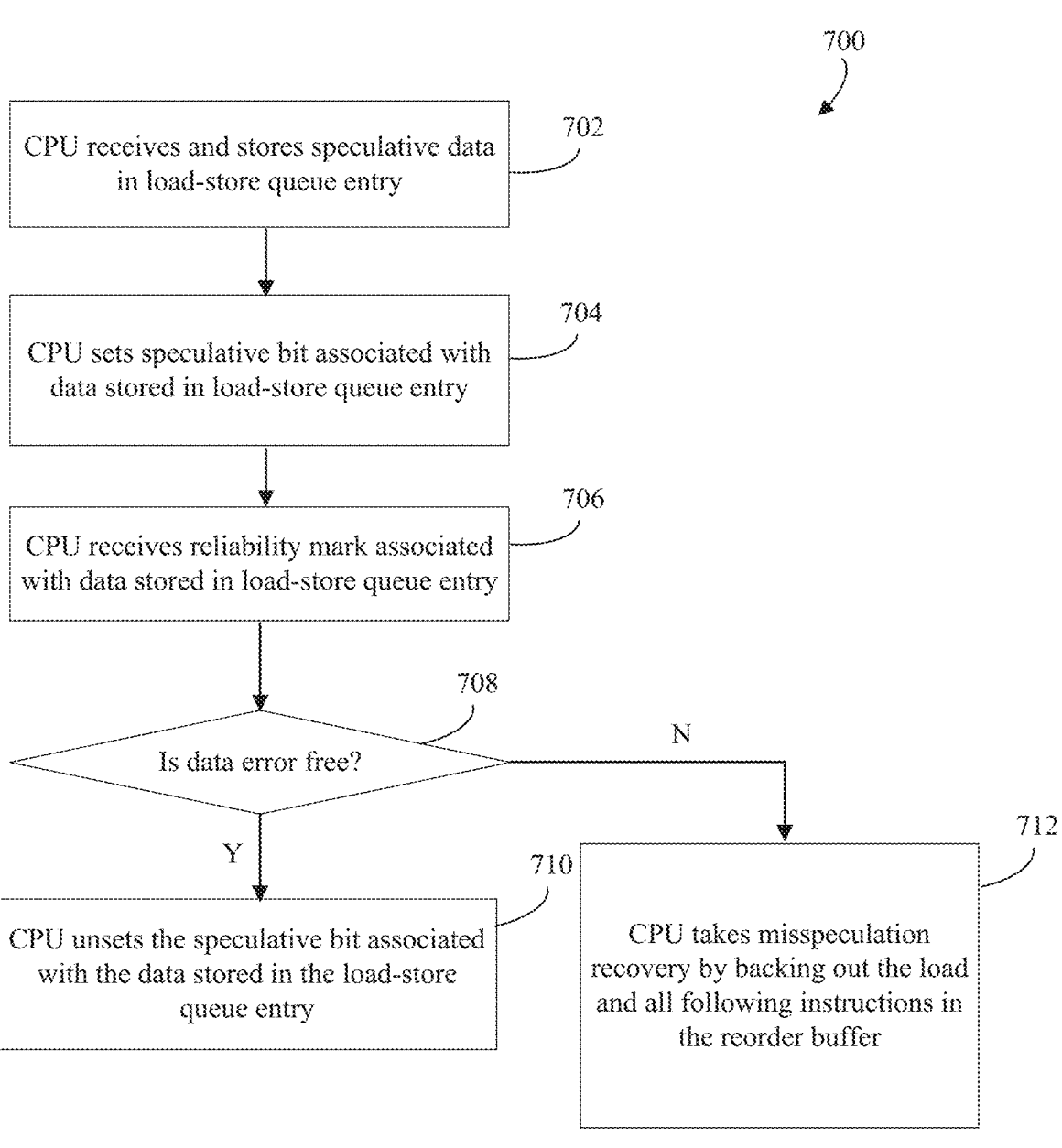

700

CPU receives and stores speculative data in load-store queue entry — 702

CPU sets speculative bit associated with data stored in load-store queue entry — 704

CPU receives reliability mark associated with data stored in load-store queue entry — 706

Is data error free? — 708

N

Y

CPU unsets the speculative bit associated with the data stored in the load-store queue entry — 710

CPU takes misspeculation recovery by backing out the load and all following instructions in the reorder buffer — 712

FIG. 7

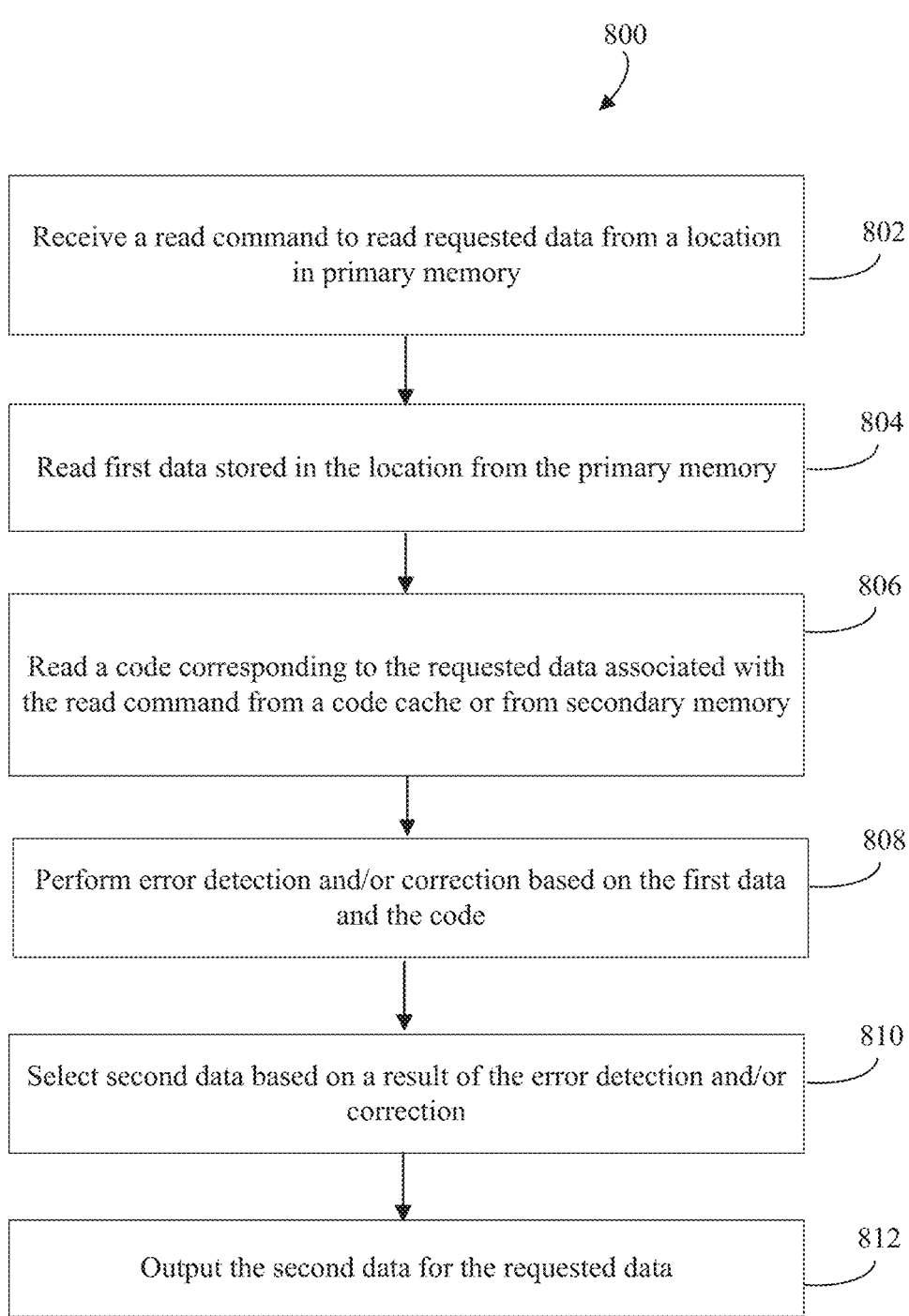

800

Receive a read command to read requested data from a location in primary memory     802

Read first data stored in the location from the primary memory     804

Read a code corresponding to the requested data associated with the read command from a code cache or from secondary memory     806

Perform error detection and/or correction based on the first data and the code     808

Select second data based on a result of the error detection and/or correction     810

Output the second data for the requested data     812

Receive a request to write data to primary memory, where the request includes the data　902

Generate, based on the data, a code corresponding to the data　904

Store the data in the primary memory　906

Store the code in secondary memory　908

Store the code in a code cache　910

SYSTEMS AND METHODS FOR VERIFYING DATA IN MEMORY

CROSS-REFERENCE TO RELATED APPLICATION

This application claims priority to and the benefit of U.S. Provisional Patent Application No. 63/537,407, filed on Sep. 8, 2023, entitled "OUT-OF-DIMM ECC FOR ENABLING ERROR RESILIENCE IN NON-ECC DIMMS," the entire content of which is incorporated by reference herein.

FIELD

Aspects of one or more embodiments of the present disclosure relate to systems and methods for verifying data stored in memory.

BACKGROUND

Error correction codes (ECCs) are designed to enable detection and/or correction of errors in data stored in memory by storing ECC information, such as parity bits or ECC codes, with the data. However, storing ECC information may introduce additional storage costs and/or may affect memory performance.

The above information disclosed in this Background section is for enhancement of understanding of the background of the present disclosure, and therefore, it may contain information that does not constitute prior art.

SUMMARY

One or more embodiments of the present disclosure are directed to verifying data stored in a primary memory based on a corresponding code (e.g., an error detection code) that is stored in secondary memory and/or in a cache of a memory controller.

According to one or more embodiments of the present disclosure, a system for verifying data in memory includes: a code cache and a memory controller connected to the code cache and configured to: receive a read command to read requested data from a location in primary memory connected to the memory controller over a first interface; read first data stored in the location from the primary memory; read a code corresponding to the requested data associated with the read command from the code cache, or from secondary memory connected to the memory controller over a second interface different from the first interface; perform error detection and/or correction based on the first data and the code; select second data based on a result of the error detection and/or correction; and output the second data for the requested data.

In some embodiments, the memory controller is further configured to: determine, based on the error detection and/or correction, that the first data is erroneous; and in accordance with the determination that the first data is erroneous, select the second data by selecting third data as the second data, the third data being different from the first data.

In some embodiments, the third data includes corrected data generated by the error detection and/or correction based on the first data and the code.

In some embodiments, the third data includes an error indicator indicating that the first data is erroneous.

In some embodiments, the memory controller is further configured to output, for the requested data, the first data and an indication that the first data is speculative before completing the error detection and/or correction, where the third data includes a reliability mark indicating whether the first data is correct or erroneous.

In some embodiments, the system further includes a processor communicably connected to the memory controller, and configured to: receive, from the memory controller, the first data and the indication that the first data is speculative; store, in a load-store queue, the first data and a value of a speculative bit associated with the first data, the value of the speculative bit corresponding to the indication that the first data is speculative; receive, from the memory controller, the third data including the reliability mark; in accordance with a determination that the reliability mark is a first reliability mark indicating that the first data is correct, change the value of the speculative bit to indicate that the first data is correct; and in accordance with a determination that the reliability mark is a second reliability mark indicating that the first data is erroneous, perform a misspeculation procedure associated with the command to read the requested data.

In some embodiments, the memory controller is further configured to: determine, based on the error detection and/or correction, that the first data is correct; and in accordance with the determination that the first data is correct, select the second data by selecting the first data as the second data.

In some embodiments, the second interface includes a cache-coherent interconnect.

In some embodiments, the code includes an error correction code (ECC) or a message authentication code (MAC).

According to one or more embodiments of the present disclosure, a system for verifying data in memory includes: a code cache and a memory controller connected to the code cache and configured to: receive a request to write data to the primary memory, where the request includes the data; generate, based on the data, a code corresponding to the data; store the data in primary memory connected to the memory controller over a first interface; store the code in secondary memory connected to the memory controller over a second interface; and store the code in the code cache.

In some embodiments, the code includes an error correction code (ECC) or a message authentication code (MAC).

In some embodiments, the second interface includes a cache-coherent interconnect.

In some embodiments, the memory controller is further configured to: store, with the code in the code cache, an indication of a location of the data in the primary memory.

In some embodiments, the system further includes: a processor connected to a last-level cache (LLC), the LLC connected to the memory controller, where the memory controller is configured to receive the request via the LLC.

In some embodiments, the system further includes: the primary memory and the secondary memory.

According to one or more embodiments of the present disclosure, a system for verifying data in memory includes: a code cache and a memory controller connected to the code cache, where the memory controller includes: an error detection (ED) code generator configured to generate codes based on data associated with write requests to write the data received by the memory controller; and error checking logic configured to detect, based on the codes generated by the code generator and stored in the code cache, errors in data read from primary memory by the memory controller during read instructions.

In some embodiments, the system further includes: a last-level cache (LLC) connected with the memory controller; and a processor connected with the LLC, where the processor includes a load-store queue for storing instructions in an order in which the instructions will be committed, and a reorder buffer configured to store instructions that are speculatively executed by the processor, where the processor is configured to read and write memory access instructions to the LLC.

In some embodiments, the memory controller is connected to the primary memory via a first interface, and connected to secondary memory via a second interface different from the first interface.

In some embodiments, the error checking logic is configured to detect the errors in the data read from the primary memory based on codes retrieved from the code cache or the secondary memory.

In some embodiments, the first interface includes an interface controller connected to the memory controller.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 7 is a flow diagram of an example method of performing a read procedure according to some embodiments of the present disclosure.

FIG. 8 is a flow diagram of a method of performing a read procedure according to some embodiments of the present disclosure.

DETAILED DESCRIPTION

Figure 1:
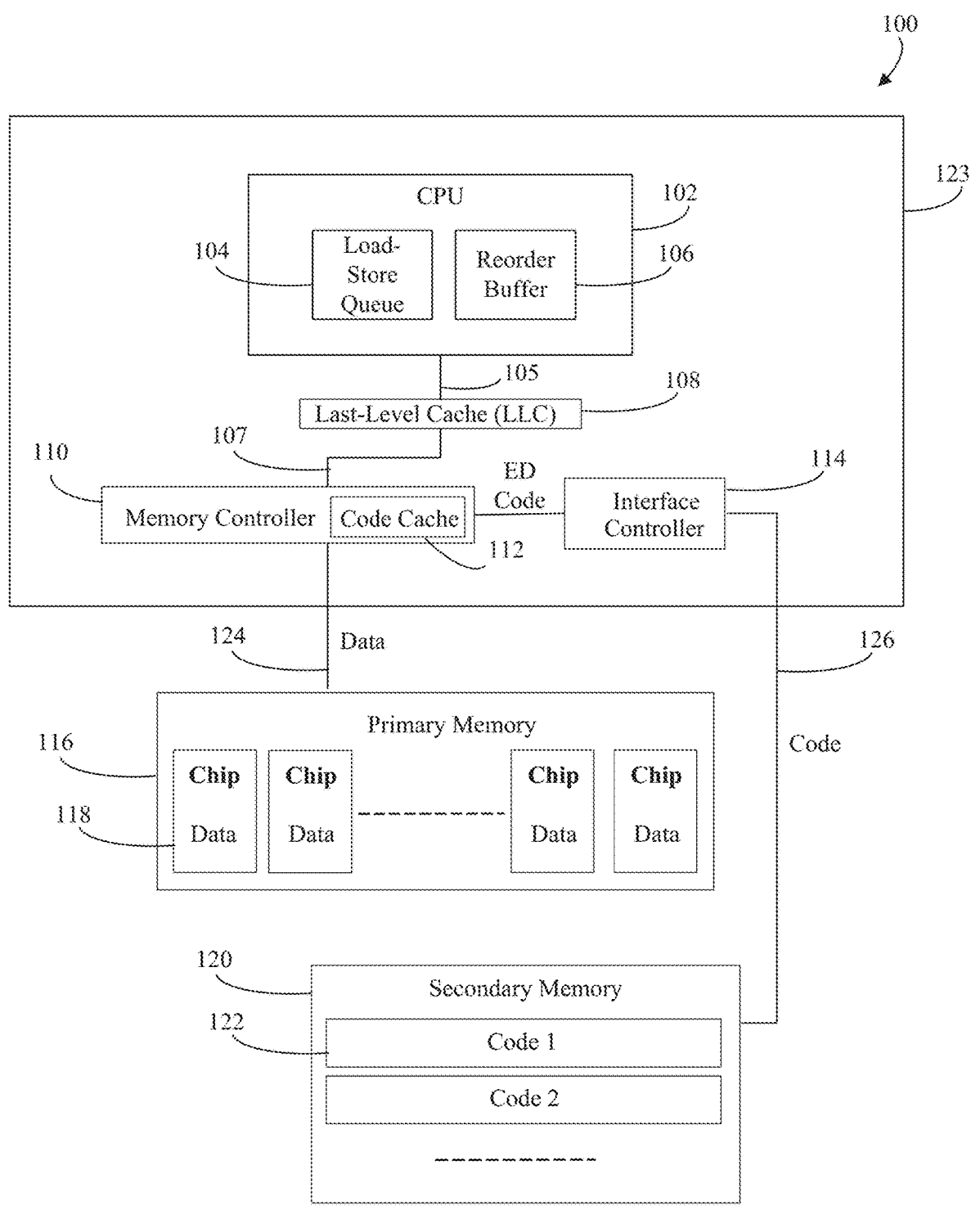
FIG. 1 is a block diagram of a memory system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Error correction codes (ECCs) may enable detection and/or correction of errors in data stored in memory by indicating ECC information, such as parity bits or ECC codes, which may be stored in a memory device. However, additional capacity may be needed for storing the ECC information, which may increase costs. For example, for DRAM, eight memory chips may be used for storing data, and a ninth memory chip may be used to store the ECC information for detecting and correcting errors in the data. Moreover, memory for storing the ECC information may be constrained to operate at slower clock speeds than that of other memory devices. As a result, some computing systems may rely on memory devices that do not store the ECC information (e.g., ECC codes), for example, due to the lower costs and/or higher clock speeds thereof. However, such memory devices may not provide the error detection and/or correction capabilities. Further, memory devices that store the ECC information (e.g., ECC codes) may do so in a single form of error detection and correction code, so that it may not support other types of error detection and/or correction codes.

According to one or more embodiments of the present disclosure, however, error detection and/or correction may be implemented for a primary memory by storing a corresponding code (e.g., an error detection and/or correction code) with the data. For example, in some embodiments, the corresponding code may be stored in secondary memory (e.g., separate from the data stored in the primary memory). In this case, when a memory controller writes data to the primary memory, the memory controller may generate and write the corresponding code (e.g., such as an ECC code or another type of error detection and/or correction code) to the secondary memory. When the memory controller subsequently reads the data from the primary memory, the memory controller may also read the corresponding code from the secondary memory, and perform error detection and/or correction on the data using the corresponding code to determine whether the retrieved data is erroneous, and in some cases, to correct the retrieved data as needed or desired.

Accordingly, the code stored in the secondary memory may be used for subsequent error detection and/or correction procedures (e.g., for memory devices that do not store ECC codes), or may provide an additional layer of redundancy (e.g., for memory devices that already store ECC codes). As such, error resiliency may be provided, and also, flexible selection of error detection and/or correction schemes may be enabled depending on the requirements of the application in which the memory is used. For example, depending on the level of reliability needed or desired for an application, a suitable error detection and/or correction procedure may be selected to implement, for example, such as single-error correcting, double-error detecting (SECDED) codes for 1-bit correction, double-error correcting, triple-error detecting (DECTED) codes for 2-bit correction, and/or message authentication codes (MACs) for detection of row-hammer attacks. In other words, the systems and methods described herein may provide support for different types of error detection and/or correction.

In some cases, reading a code (e.g., an error detection and/or correction code) from secondary memory may increase the read latency of the corresponding data, because it may take longer to retrieve the data and the code than to retrieve only the data. As such, the memory controller may wait to return the data (e.g., to the CPU) until the error detection and/or correction procedure is completed.

According to one or more embodiments of the present disclosure, however, to reduce the frequency of longer read latencies associated with retrieving the code from the secondary memory, when the memory controller writes data to the primary memory, the memory controller may store the corresponding code (e.g., ECC code, MAC, or other type of error detection and/or correction code) in a code cache (e.g., SRAM) on the memory controller. In this case, when the memory controller receives a subsequent request to read the data, the memory controller may first check the code cache to determine whether the corresponding code is contained in the cache. If the corresponding code is contained in the code cache, the additional read latency associated with retrieving the corresponding code from the secondary memory may be avoided. In some embodiments, the memory controller may access the code cache right after the read request is inserted in the read queue of the memory controller. In this case, the majority of code cache misses (if occurred) may be hidden, because the miss latency is overlapped with the sum of (1) the time the read request is waiting in the read queue of the memory controller, (2) the primary memory scheduling time, and (3) the completion time of the read operation to read the data from the primary memory.

In some cases, it may be desirable to further mitigate the additional read latency, for example, in cases where the code is not cached. According to one or more embodiments of the present disclosure, the memory controller may forward the retrieved data (e.g., the data read from the primary memory) to a load-store queue of the CPU (e.g., via a last-level cache) before the error detection and/or correction procedure is completed. In some embodiments, when the memory controller forwards the data to the load-store queue before the error detection and/or correction procedure is completed, the memory controller may mark the data as speculative (e.g., by sending, to the load-store queue, an indication that the data is speculative). As such, the CPU may be enabled to speculatively execute subsequent instructions that use the data read from the primary memory, while waiting for the memory controller to determine whether or not the data is erroneous. In this case, in some embodiments, the CPU may maintain the corresponding load instruction (e.g., the read instruction that requested the data) in a reorder buffer (ROB) until the CPU receives, from the memory controller, an indication of whether the data forwarded by the memory controller was erroneous. In some embodiments, after the memory controller completes the error detection and/or correction on the data, the memory controller may send, to the CPU, an indication of the result of the error detection and/or correction (e.g., an indication of whether the previously forwarded data was correct or incorrect). In some embodiments, if the memory controller sends an indication that the data was correct (e.g., not erroneous), the load instruction may be retired from the ROB, and the data and/or results that were generated by the CPU based on the data may be committed (e.g., saved in registers and/or memory, such that the data and/or results are architecturally visible). In some examples, if the memory controller sends an indication that the data was erroneous, the load instruction may be flushed from the ROB along with the following instructions, and any results that were generated based on the erroneous data may be reversed (e.g., not committed). Accordingly, in some embodiments, CPU features that support out-of-order execution and speculative execution may be leveraged to support the use of speculative data.

The above and/or other aspects and features of the present disclosure will be described in more detail hereinafter with reference to the figures.

FIG. 1 is a block diagram of a memory system 100 according to one or more embodiments of the present disclosure.

System 100 includes a CPU (e.g., a host processor) 102 having one or more processing units (e.g., processors or other processing circuitry) that are configured to execute instructions (e.g., stored in memory), such as read/write memory access instructions and other instructions. In some embodiments, the CPU 102 is configured to perform out-of-order and/or speculative execution of instructions, and includes a load-store queue 104 and a reorder buffer (ROB) 106 to support these features. For example, the CPU 102 may be configured to perform speculative execution of instructions by preemptively executing some instructions before determining that the instructions will be needed (e.g., by predicting branch outcomes) so that the results are available sooner. If the CPU 102 subsequently determines that the speculatively executed instructions were needed (e.g., the predicted branch is taken), the CPU 102 commits the results of the speculatively executed instructions. If the CPU 102 subsequently determines that the speculatively executed instructions were not needed (e.g., a different branch was taken), the CPU 102 backs out (e.g., reverses) the results of the speculatively executed instructions.

The CPU 102 may be a processing circuit, for example, such as a general-purpose processor or a central processing unit core of a subsystem or device 123. The CPU 102 may be connected to other components via an address bus, a control bus, a data bus, and/or the like. The CPU 102 may execute instructions stored in memory (e.g., primary memory 116) to perform the various operations described herein and/or to cause such operations to be performed by other components, such as by the memory controller 110, LLC 108, interface controller 114, and/or other components. For example, the CPU 102 may execute one or more system processes and background processes (which are described in more detail below), which may be copied from persistent storage (e.g., a storage device, read-only memory (ROM), and/or the like) to the memory as needed or desired (e.g., at startup, execution time, interrupt routine, and/or the like).

The load-store queue 104 is configured to store a queue of load and/or store instructions (e.g., instructions to read or write data) in an order in which the results of the instructions will be committed. Such instructions may include, for example, an operation to be performed (e.g., a read or write), a memory address (e.g., a memory address of data to be read), and/or data (e.g., data to be written to memory). The ROB 106 is configured to temporarily store instructions and corresponding data in the ROB 106 until the instructions are committed.

The CPU 102 is electrically coupled with a last-level cache (LLC) 108 that is used for caching instructions and/or data to reduce the frequency of accesses to memory (e.g., the primary memory 116 or other memory, such as external memory). For example, the CPU 102 writes memory access instructions and/or data to the LLC 108 and/or reads data from the LLC 108. In some embodiments, the LLC 108 is a 64-bit cache. In some embodiments, one or more additional caches may be coupled between the CPU 102 and the LLC 108 to implement a multi-level cache hierarchy, with the LLC 108 being the last (e.g., highest) cache level before the memory controller 110 is used to access the memory. In this case, the CPU 102 may be electrically coupled with the LLC 108 via the one or more additional caches.

The memory controller 110 is connected to the primary memory 116 via a first memory interface 124. In some embodiments, the primary memory 116 may be composed of any suitable memory device that does not store ECC codes (e.g., non-ECC memory), and may include, for example, one or more DRAM chips without a separate chip for storing the ECC codes. In some embodiments, the primary memory 116 may be composed of any suitable memory device that includes a separate chip for storing the ECC codes. In some embodiments, the primary memory 116 may include (or may be) volatile memory, for example, such as dynamic random access memory (DRAM) that may be directly connected to a memory slot of a motherboard of the CPU 102 via the first memory interface 124. In this case, the first memory interface 124 (e.g., the connector and the protocol thereof) may conform to a dual in-line memory module (DIMM) to facilitate communications between the primary memory 116 and the CPU 102 (e.g., via the CPU OS/kernel), such that the primary memory 116 may be the DIMM memory connected to the DIMM slot of the CPU 102. For example, the primary memory 116 may be or may include a DIMM that includes multiple (e.g., eight or a different number of) DRAM chips (e.g., chip 118) or modules. However, the present disclosure is not limited thereto, and the primary memory 116 may include (or may be) any suitable high performing main memory replacement for the CPU 102 as would be known to those skilled in the art. For example, in other embodiments, the primary memory 116 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The memory controller 110 is responsible for scheduling and executing data transfers between the CPU 102 and the memory devices (e.g., via the LLC 108), such as between CPU 102 and the primary memory 116. For example, the memory controller 110 stores data in the primary memory 116 (e.g., in response to receiving a request to write the data), and reads data from the primary memory 116 (e.g., in response to receiving a read command). The memory controller 110 may include at least one processing component embedded thereon for interfacing with the CPU 102 and the primary memory 116. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing the memory access instructions (e.g., via firmware and/or software) to provide access to and from the data stored in the primary memory 116 according to the memory access instructions. In some embodiments, the CPU 102, LLC 108, memory controller 110, and interface controller 114 are included in a subsystem or device 123 (e.g., a single integrated subsystem or device), such as a circuit board or system-on-chip (SOC).

In brief overview, and as described in more detail below with reference to FIG. 2, the memory controller 110 generates codes (e.g., error detection and/or correction codes) corresponding to the data that is read from or written to the primary memory 116. The memory controller 110 is connected to a code cache (e.g., an error detection and/or correction code cache) 112 that is used for caching the codes to reduce latencies associated with retrieving the codes. In some embodiments, the memory controller 110 includes the code cache 112 (e.g., as part of a single chip), such as shown in FIG. 1. In other embodiments, the code cache 112 is external to the memory controller 110. The codes may include, for example, ECC codes such as block codes or convolutional codes, SECDED codes, DECTED codes, MACs, and/or any other suitable kinds of codes that can be used for error detection and/or error correction (e.g., for detecting and/or correcting errors in corresponding data that is retrieved from the primary memory 116). In some embodiments, the code cache 112 may be implemented using high-speed volatile memory, such as static random-access memory (SRAM).

The memory controller 110 is coupled (e.g., electrically connected) with an interface controller 114 for accessing secondary memory 120. The interface controller 114 formats information for transmission and parses received information according to a communication protocol or standard, such as compute express link (CXL) or on a periphery component interconnect (PCI). In some embodiments, the interface controller 114 may include at least one processing component embedded thereon for interfacing with the memory controller 110 and the secondary memory 120. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing instructions (e.g., via firmware and/or software) to provide access to and from the codes stored in the secondary memory 120.

The secondary memory 120 may be composed of any suitable memory device, such as DRAM, that is used to store the codes 122 generated by the memory controller 110. In some embodiments, the interface controller 114 is connected to the secondary memory 120 via a second memory interface 126 that is different from the first memory interface 124. For example, the second memory interface 126 may be based on a different communication protocol than that of the first memory interface 124, and/or may use a different conductive path than that of the first memory interface 124. In some embodiments, interface controller 114 may be a cache-coherent controller (e.g., a CXL controller or other suitable cache-coherent controller), and the second memory interface 126 (e.g., the connector and the protocol thereof) may include (e.g., conforms to) a cache-coherent interconnect (e.g., a CXL or other suitable cache-coherent interconnect built on periphery component interconnect express (PCIe)) to facilitate communications between the interface controller 114 and the secondary memory 120. In other embodiments, the second memory interface 126 (e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the second memory interface 126 (e.g., the connector and the protocol thereof) may include (or may conform to) various general-purpose interfaces, for example, such as Ethernet, Universal Serial Bus (USB), and/or the like.

The secondary memory 120 may include one or more memory devices, such as one or more CXL memory devices. In some embodiments, the secondary memory 120 includes a disaggregated CXL memory pool including a plurality of different types of CXL memory devices, which may typically include volatile memory such as DRAM, for example, from among DDR3, DDR4, DDR5, low-power, high-power, low-profile, PMEM, HBM, SSD with DRAM, and/or the like. However, the present disclosure is not limited thereto, and the secondary memory 120 may include (or may be) any suitable type of memory as would be known to those skilled in the art.

For example, in some embodiments, the secondary memory 120 may be implemented with a suitable storage device to persistently store data and/or the codes accessible by the CPU 102 and/or the memory controller 110. In this context, the secondary memory 120 may include (or may be) relatively slower memory when compared to the high performing primary memory 116. For example, in some embodiments, the secondary memory 120 may be a Solid-State Drive (SSD). However, the present disclosure is not limited thereto, and in other embodiments, the secondary memory 120 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the secondary memory 120 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 110 may conform to any suitable or desired derivative of these form factors.

Figure 2:
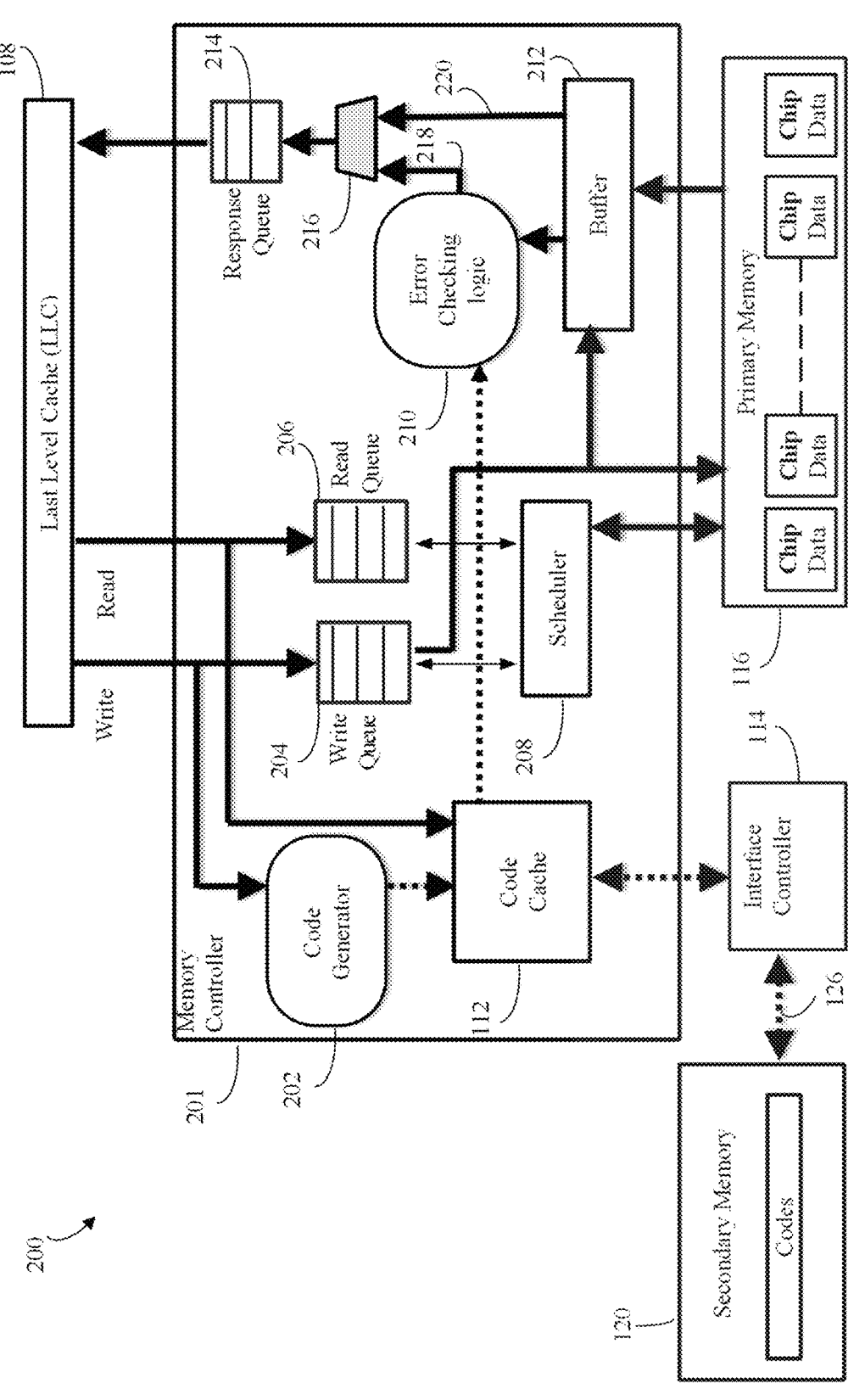
FIG. 2 is a block diagram of a memory system for verifying data in memory according to one or more embodiments of the present disclosure.

FIG. 2 is a block diagram of a memory system 200 for verifying data in memory according to one or more embodiments of the present disclosure.

System 200 includes a memory controller 201, which may be an example of the memory controller 110 described above with reference to FIG. 1. System 200 may also include the LLC 108, the code cache 112 (e.g., in the memory controller 201), the interface controller 114, the primary memory 116, and the secondary memory 120, as described above with reference to FIG. 1. In FIG. 2, the dashed directional lines depict communication paths over which the codes are communicated between elements, and the solid directional lines depict communication paths over which data and/or instructions are communicated between elements.

The memory controller 201 receives read (load) commands and write requests from the LLC 108 (which itself is electrically coupled with a load/store queue, as described above with reference to FIG. 1), and manages the memory accesses associated with the read commands and write requests (e.g., the memory accesses required to write the data associated with a write request or read the data requested by a read command).

In the example of FIG. 2, the memory controller 201 includes a code generator 202 for generating the codes (e.g., the error detection and/or correction codes) based on data received in a write request (e.g., from the LLC 108). The code generator 202 includes processing circuitry and/or commands for generating the code based on the data. For example, the code generator 202 may implement ECC code generation by generating a single-error correction (SEC) code, a SECDEC code, a DECTED code, a MAC code, or another suitable kind of error detection and/or correction code that can subsequently be used by the memory controller 201 to detect and/or correct errors in the data. As discussed above, the memory controller 201 stores the generated code in the code cache 112 of the memory controller 201, and writes the code to the secondary memory 120 (e.g., via the interface controller 114 and the second memory interface 126). In some embodiments, the memory controller 201 stores a memory address associated with the corresponding data (e.g., an address in the primary memory 116 at which the corresponding data is stored) with the code to enable the memory controller to retrieve the appropriate code when it reads the corresponding data from the primary memory 116.

The memory controller 201 includes a write queue 204, a read queue 206, and a scheduler 208 that are used to schedule reads and writes of data to the primary memory 116 (e.g., to optimize memory access times). For example, the memory controller 201 saves write requests received from the LLC 108 in the write queue 204 until the scheduler 208 determines a suitable time to execute the write requests. Similarly, the memory controller 201 saves read commands in the read queue 206 until the scheduler 208 determines a suitable time to execute the read commands. In the example of FIG. 2, the memory controller 201 also includes a buffer 212 for buffering the data associated with read commands and write requests.

The memory controller 201 includes error checking logic 210 for verifying the data that is read from the primary memory 116. The error checking logic 210 includes circuitry and/or instructions for verifying the data using (e.g., based on) the data and a corresponding code that is read from the code cache 112 and/or the secondary memory 120 (e.g., a code that was generated based on the data when it was written to the primary memory 116). For example, when the memory controller 201 receives a read command that requests data in the primary memory 116, the memory controller 201 reads the requested data from the primary memory 116, and retrieves (e.g., reads) the corresponding code associated with the requested data from either the code cache 112 (if the corresponding code is present in the code cache 112) or from the secondary memory 120 (if the corresponding code is absent from the code cache 112). In some examples, a code that corresponds to data is associated with (e.g., stored with) a memory address of the data to enable the corresponding code to be retrieved based on the memory address when the data at the memory address is retrieved. In some embodiments, when the code is absent from the code cache 112 (e.g., such as in a cache miss), the memory controller 201 writes the code to the code cache 112 after reading the code from the secondary memory 120, thereby updating the code cache 112 with the most recently used code.

The memory controller 201 provides the data and the corresponding code to the error checking logic 210, and the error checking logic 210 performs error detection and/or correction based on the code and the data, such as by generating a second code based on the data, and comparing the second code with the code retrieved from either the secondary memory 120 or the code cache 112 to determine whether the codes match (e.g., whether the data is correct). In some embodiments, the error checking logic 210 determines whether the data read from the primary memory 116 is correct or erroneous based on the error detection and/or correction. In some embodiments, in accordance with a determination that the data is correct, the error checking logic 210 outputs the data and/or outputs an indication that the data is correct (e.g. via communication path 218).

In some embodiments, in accordance with a determination that the data is erroneous and correctable (e.g., the data can be corrected during the error detection and correction, such as when the error is a single-bit error), the error checking logic 210 corrects the data to generate corrected data, and outputs the corrected data (e.g., via the communication path 218). In some embodiments, in accordance with a determination that the data is erroneous and is not correctable (e.g., such as when the error is a multi-bit error or the error checking logic 210 does not include error correction capabilities), the error checking logic 210 outputs an error indicator indicating that the data is erroneous (e.g., via the communication path 218).

In the example of FIG. 2, the memory controller 201 includes a multiplexer 216 for selecting either the data that is read from the primary memory 116 (e.g., provided to the multiplexer 216 via communication path 220) or the output of the error checking logic 210 (e.g., provided to the multiplexer 216 via the communication path 218) to provide to the LLC 108 (optionally, via a response queue 214). For example, if the error checking logic 210 determines that the data is correct (e.g., not erroneous), the memory controller 201 may cause the multiplexer 216 to select the data read from the primary memory 116 to provide to the LLC 108. For example, if the error checking logic 210 determines that the data is erroneous, and outputs corrected data or an indication that the data is erroneous, the memory controller 201 may cause the multiplexer 216 to select the corrected data or the indication that the data is erroneous to provide to the LLC 108.

Figure 3:
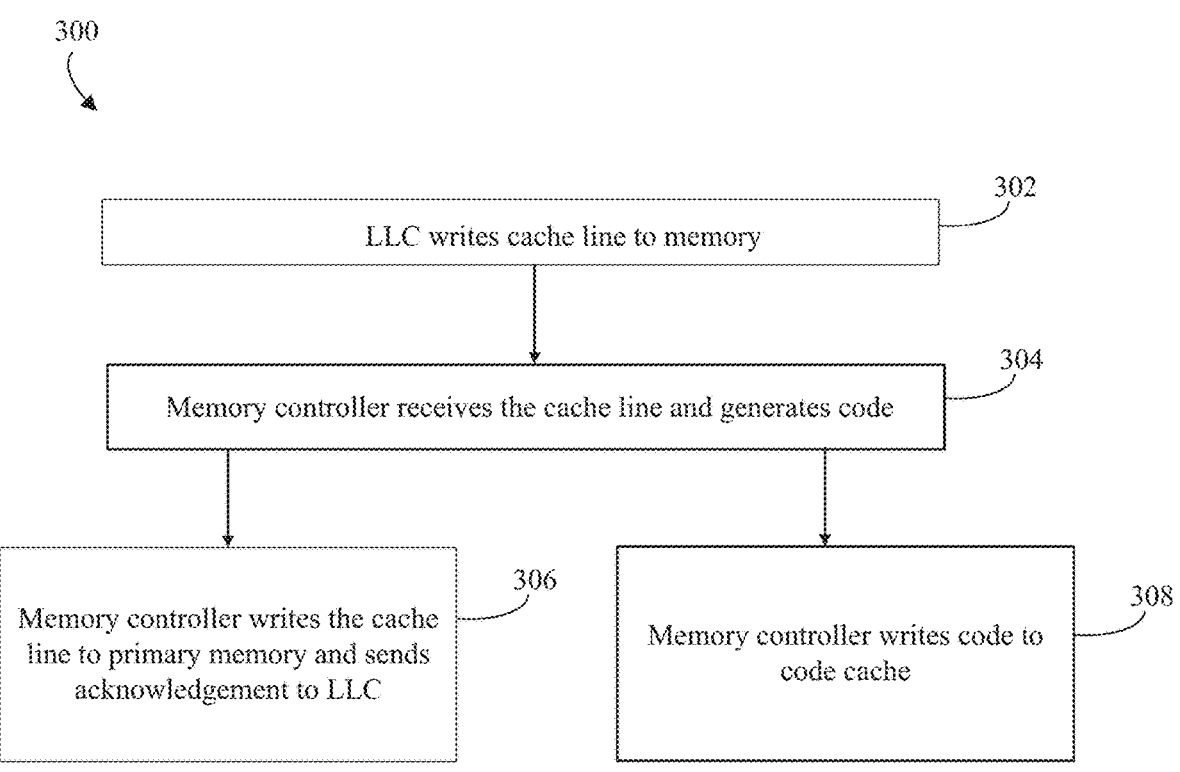
FIG. 3 is a flow diagram of an example method of performing a write procedure according to some embodiments of the present disclosure.

FIG. 3 is a flow diagram of an example method 300 of performing a write procedure according to some embodiments. In some embodiments, the method 300 is performed by the system 100 and/or the system 200 described above with reference to FIGS. 1 and 2, respectively. However, the present disclosure is not limited thereto, and the operations shown in the method 300 may be performed by any suitable one of the components and elements or any suitable combination of the components and elements of those of the one or more example embodiments described above. Further, the present disclosure is not limited to the sequence or number of the operations of the method 300 shown in FIG. 3, and can be altered into any desired sequence or number of operations as recognized by a person having ordinary skill in the art. For example, in some embodiments, the order may vary, or the method 300 may include fewer or additional operations.

Referring to FIG. 3, at operation 302, an LLC (e.g., the LLC 108) writes a cache line to memory that includes data to be written to primary memory (e.g., the primary memory 116). In some embodiments, the LLC writes the cache line (e.g., a line of the LLC) to memory when the cache line is evicted from the cache to make room for others (e.g., when a load instruction needs to bring corresponding data to the LLC). In some embodiments, the LLC writes the cache line to memory by sending a request to a memory controller (e.g., memory controller 110 or 201). For example, in some embodiments, the LLC queues the request to the write queue 204.

At operation 304, the memory controller receives the cache line from the LLC, and generates a code (e.g., using the code generator 202). For example, the memory controller provides the data received in the cache line from the LLC to the code generator 202, and the code generator 202 generates the code (e.g., the error detection and/or correction code) corresponding to the data.

At operation 306, the memory controller writes the cache line to the primary memory, and sends an acknowledgement to the LLC. For example, the memory controller writes the data included in the cache line to the primary memory at a memory address that is determined by the memory controller. In some embodiments, the memory controller writes the cache line to the primary memory by transmitting the data (e.g., along with an address and write request) to the primary memory via a first memory interface, such as the memory interface 124, to cause the primary memory to store the data in the primary memory.

At operation 308 (which may be concurrently performed with or at least partially temporally overlapped with operation 306), the memory controller writes the code to the code cache (e.g., code cache 112). For example, the memory controller writes the code to the code cache by causing the code to be stored in a line of the code cache, optionally along with an indication of the location at which the corresponding data is stored in primary memory. In some embodiments, the memory controller may determine whether the line for the code for the corresponding data already exists in the code cache, and if so (e.g., on a cache hit), may write (e.g., may override) the code in the corresponding line of the code cache. In some embodiments, if the code for the corresponding data is being stored for the first time in the code cache or the previously stored cache line has been evicted from the cache, the memory controller (e.g., via the interface controller 114) may fetch a suitable line for the code from secondary memory (e.g., the secondary memory 120), and may write the code to a corresponding line in the code cache.

Figure 4:
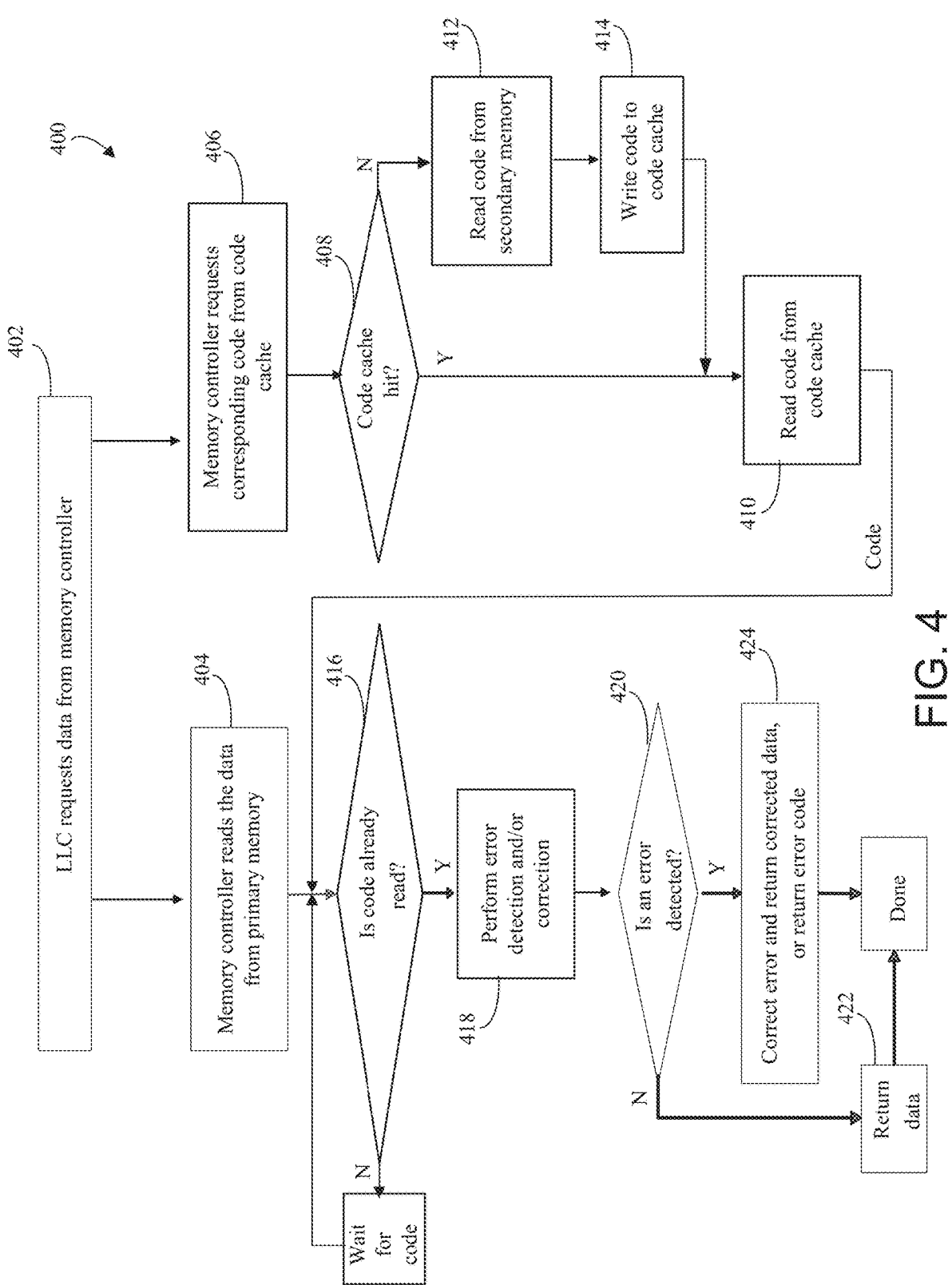
FIG. 4 is a flow diagram of an example method of performing a read procedure according to some embodiments of the present disclosure.

FIG. 4 is a flow diagram of an example method 400 of performing a read procedure according to some embodiments. In some embodiments, the method 400 may be performed by the system 100 and/or the system 200 described above with reference to FIGS. 1 and 2, respectively. However, the present disclosure is not limited thereto, and the operations shown in the method 400 may be performed by any suitable one of the components and elements or any suitable combination of the components and elements of those of the one or more example embodiments described above. Further, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations.

At operation 402, an LLC (e.g., the LLC 108) requests data from a memory controller (e.g., the memory controller 110 or 201). In some embodiments, the LLC requests the data from the memory controller in response to receiving, from a CPU (e.g., the CPU 102), an instruction to read the data (e.g., an instruction including an indication of a read operation and a memory address associated with the data). The LLC requests the data from the memory controller by sending a read command to the memory controller to read the data. For example, in some embodiments, the LLC queues the read command to the read queue 206. The read command includes a memory address at which the data is stored in primary memory.

At operation 404, in response to receiving the read command from the LLC, the memory controller reads the data from primary memory (e.g., the primary memory 116). In some embodiments, the memory controller reads (e.g., receives) the data from the primary memory via a first memory interface, such as the memory interface 124.

At operation 406 (which may be concurrently performed with or at least partially temporally overlapped with operation 404), in response to receiving the request to read the data from the LLC, the memory controller requests the corresponding code from the code cache (e.g., the code cache 112). The corresponding code may be the code that was generated based on the data when the data was stored, such as described above with reference to operation 304 of FIG. 3.

At operation 408, the memory controller determines whether there is a code cache hit (e.g., YES at operation 408) by determining whether the corresponding code is present in the code cache or is absent (e.g., cache miss) from the code cache.

At operation 410, in accordance with a determination that there is a code cache hit (e.g., the code is present in the code cache), the memory controller reads the code from the code cache.

At operation 412, in accordance with a determination that there is not a code cache hit (e.g., the code is absent from the code cache, or in other words, a cache miss), the memory controller reads (e.g., via the interface controller 114) the code from secondary memory, such as the secondary memory 120. In some embodiments, the memory controller reads the code from the secondary memory via a second memory interface different from the first memory interface, such as the second memory interface 126.

At operation 414, in accordance with the determination that there is not a code cache hit (e.g., the code is absent from the code cache), and after reading the code from the secondary memory (e.g., via the interface controller 114), the memory controller (or the interface controller 114) writes the code to the code cache. In some embodiments, the memory controller reads the code from the code cache (e.g., similar to operation 410 described above). In other embodiments, the memory controller may use the code read from the secondary memory (e.g., via the interface controller 114) for error detection and/or correction, and may write the code to the code cache concurrently or subsequently.

At operation 416, after reading the data from the primary memory, the memory controller determines whether the code has been read (e.g., whether the code has been read from the code cache or from the secondary memory, and is available for performing error detection and/or correction). In accordance with a determination at operation 416 that the code has not yet been read (e.g., NO at operation 416), the memory controller may wait until the code has been read.

In accordance with a determination at operation 416 that the code has been read (e.g., YES at operation 416), at operation 418, the memory controller performs error detection and/or correction based on the data read from the primary memory and the corresponding code read from either the code cache (at operation 410) or the secondary memory (at operation 412). For example, the error checking logic 210 of the memory controller performs error detection and/or correction based on the data and the corresponding code.

At operation 420, the memory controller determines whether an error was detected during the error detection and/or correction procedure. For example, the error checking logic 210 of the memory controller may determine whether or not an error is detected at operation 420 during the error detection and/or correction.

In accordance with a determination that an error was not detected at operation 420 (e.g., the data that was read from the primary memory at operation 404 is correct and is not erroneous), at operation 422, the memory controller returns the data that was read from the primary memory at operation 404 (e.g., as-is). For example, the memory controller may return the data by writing the data to the response queue 214 or to the LLC 108 (optionally, via a multiplexer such as the multiplexer 216).

In accordance with a determination that an error is detected at operation 420 (e.g., the data read from the primary memory at operation 404 is incorrect or erroneous), at operation 424, the memory controller may correct the data (if possible) and return the corrected data, or if the error is uncorrectable (e.g., the error checking logic 210 is unable to correct the detected error), the memory controller may return an error code indicating that the data is erroneous. For example, if the error checking logic 210 detects an uncorrectable error (or does not implement error correction capabilities), the error checking logic 210 outputs an error code indicating that the data is erroneous, and the memory controller provides the error code to, for example, the response queue 214 or the LLC 108 (optionally, via a multiplexer such as the multiplexer 216).

Figure 5:
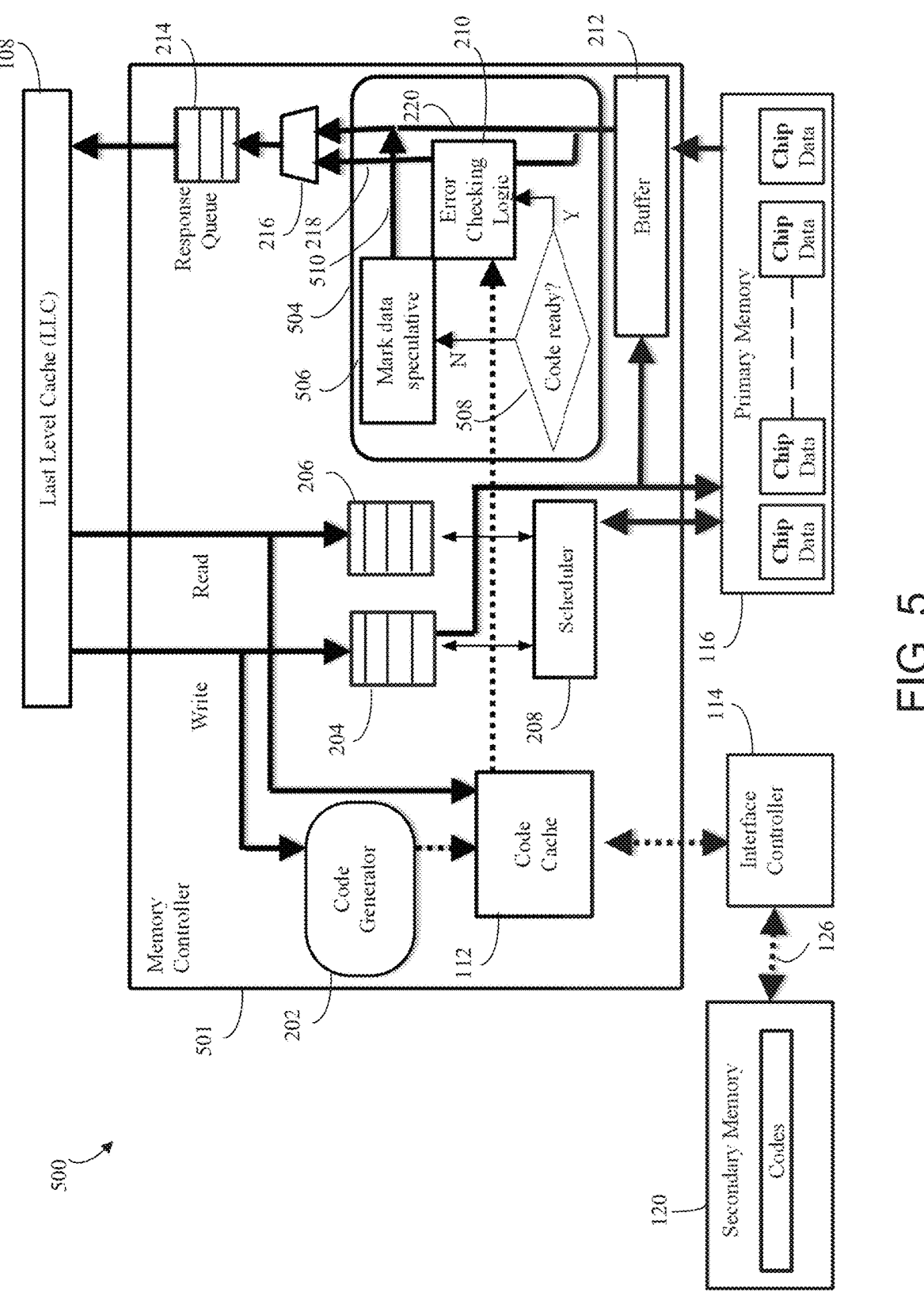
FIG. 5 is a block diagram of a memory system for verifying data in memory according to one or more embodiments of the present disclosure.

FIG. 5 is a block diagram of a memory system 500 for verifying data in memory according to one or more embodiments of the present disclosure. System 500 includes a memory controller 501, and many of the same or substantially the same elements described above with reference to the system 200 of FIG. 2 (e.g., as indicated by the same reference numbers). Memory controller 501 may be another example implementation of the memory controller 110 described above with reference to FIG. 1.

Referring to FIG. 5, the memory controller 501 is similar to memory controller 201, in that it is configured to read and write data from and to the primary memory 116, generate and store codes, and verify data based on the stored codes as described above with reference to FIGS. 3 and 4. However, the memory controller 501 may implement additional functionality relative to the memory controller 201. In more detail, waiting until the error detection and/or correction procedure is completed before returning (e.g., outputting) the data that was read from the primary memory 116 to, for example, the response queue 214 or LLC 108, may incur additional read latency in cases where the code is absent from the code cache 112 and must be read from the secondary memory 120. As such, in some embodiments, the memory controller 501 may be configured to return data that is read from the primary memory 116 at the time when it is read from the primary memory 116 (e.g., in response to reading the data from the primary memory 116) without waiting for the code to be read from the secondary memory 120 and/or without waiting for the error detection and/or correction procedure to be completed. For example, the memory controller 501 may return the data read from the primary memory 116 to the response queue 214 via the communication path 220 and the multiplexer 216.

For example, the memory controller 501 may include error checking and forwarding logic 504. Error checking and forwarding logic 504 includes the error checking logic 210 described above with reference to FIG. 3, code availability logic 508, and speculative data marking logic 506. In some embodiments, code availability logic 508 and/or speculative data marking logic 506 are included in the error checking logic 210. In some embodiments, code availability logic 508 and/or speculative data marking logic 506 are implemented using separate circuitry and/or instructions than the error checking logic 210. code availability logic 508 is configured to determine, during a read operation (e.g., when memory controller 501 is executing a read instruction to read data from primary memory 116), whether the corresponding code is ready for use in error detection and/or correction performed by the error checking logic 210. In some embodiments, the code availability logic 508 determines that the code is ready based on determining that the code has been read from the secondary memory 120 or from the code cache 112. In some embodiments, the code availability logic 508 is included in the error checking logic 210. In some embodiments, in accordance with a determination that the code is ready, the error checking logic 210 performs error detection and/or correction based on the code and the data read from the primary memory 116.

In some embodiments, if the data read from the primary memory 116 is returned to the response queue 214 or LLC 108 before the code is read and/or before the error detection and/or correction procedure is completed, the speculative data marking logic 506 outputs an indication that the data is speculative. For example, the speculative data marking logic 506 may output one or more bits that are set to a first value (e.g., "1") if the data is speculative, and set to a second value (e.g., "0") if the data is not speculative (e.g., if the error detection and/or correction has been completed). In some embodiments, the memory controller 501 outputs the indication that the data is speculative with (e.g., concurrently or at the same time as) the data, as part of a single output record. For example, the indication that the data is speculative may be appended to the data, and the data with the appended indication may be provided to the multiplexer 216. In some embodiments, the memory controller 501 outputs the indication that the data is speculative separately from the outputting of the data (e.g., the indication that the data is speculative is output such that it is temporally or logically separated from the data, such as by providing the indication that the data is speculative to the multiplexer 216 before or after providing the data to the multiplexer 216). In some embodiments, the LLC 108 receives, from the memory controller 501, the data and the indication that the data is speculative, and stores the data and the indication that the data is speculative in the LLC 108.

In some embodiments, after the error checking and forwarding logic 504 outputs the data with an indication that the data is speculative, the error checking and forwarding logic 504 waits until the code is ready (e.g., the code has been read from the secondary memory 120 or the code cache 112), and then performs the error detection and/or correction procedure based on the data read from the primary memory 116 and the corresponding code to determine whether the data read from the primary memory 116 is correct or erroneous. In some embodiments, after completing the error detection and/or correction procedure, the error checking logic 210 outputs a reliability mark (e.g., via the communication path 218) indicating whether the data previously returned to the response queue 214 was correct or erroneous. The reliability mark may include one or more bits that are set to a first value (e.g., "1") in accordance with a determination by the error checking logic 210 that the data was correct, and set to a second value (e.g., "0") in accordance with a determination by the error checking logic 210 that the data was erroneous.

In some embodiments, when the code is present in the code cache 112 (and thus, the additional read latency is minimized or reduced), the memory controller 501 functions in a manner similar to that described above with reference to the memory controller 201. For example, the memory controller 501 performs the error detection and/or correction procedure (e.g., using the error checking logic 210) based on the code retrieved from the code cache 112 and the data read from the primary memory 116. The memory controller 501 then uses the multiplexer 216 to select either the data read from the primary memory 116 or the output of the error checking logic 210, to provide to the response queue 214, based on a determination of whether the data read from the primary memory 116 is correct or erroneous.

In some embodiments, when the code is absent from the code cache 112 (and thus, the memory controller 501 may incur additional latency reading the code from the secondary memory 120) the memory controller 501 outputs the data with the indication that the data is speculative, performs the error detection and/or correction procedure once the code is read from secondary memory 210, and outputs a reliability mark based on the output of the error detection and/or correction procedure, as described above. In some embodiments, when the code is absent from the code cache 112, the memory controller 501 writes the code to the code cache after reading the ED code from the secondary memory 120, thereby updating the code cache with the most recently used code.

Figure 6:
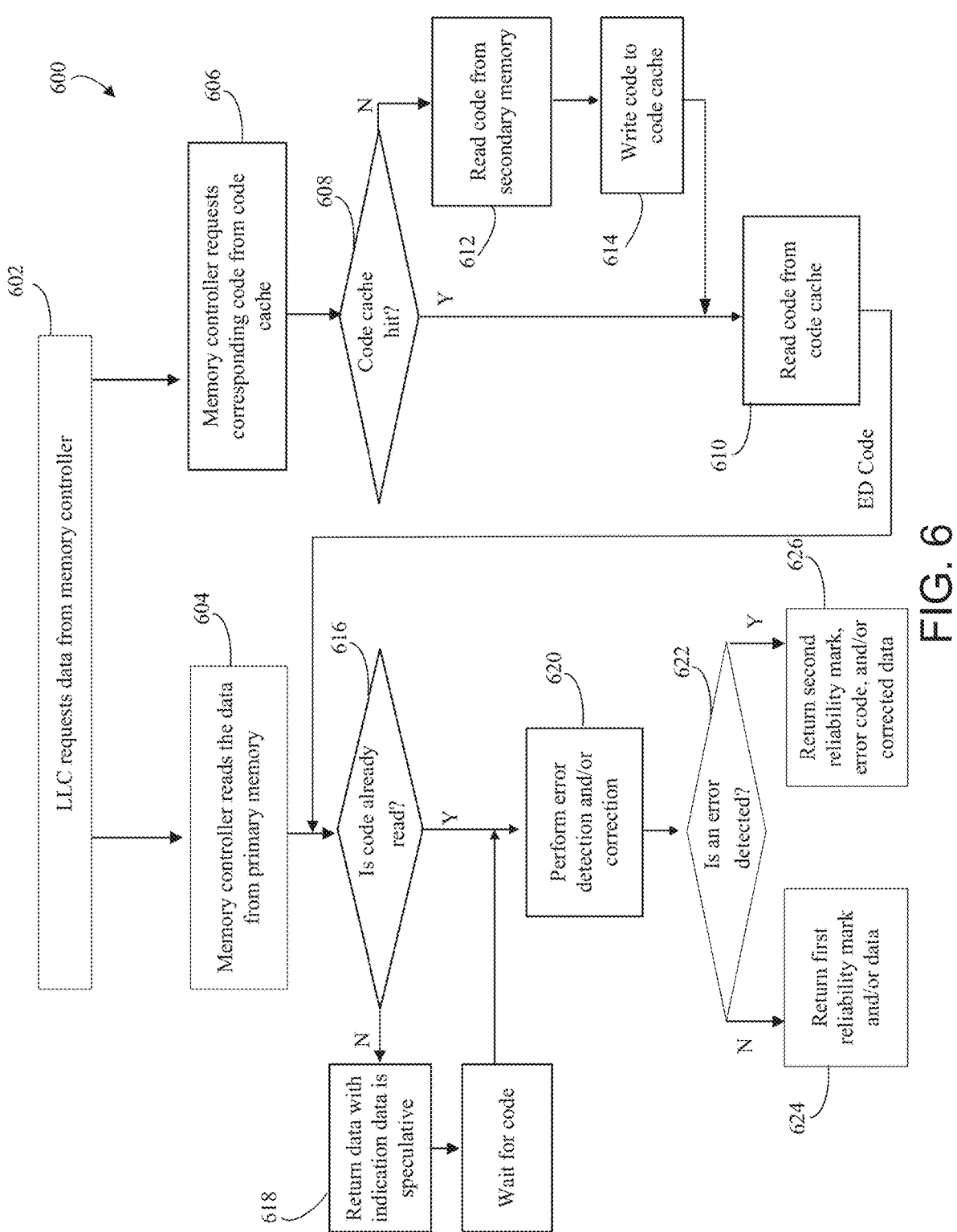
FIG. 6 is a flow diagram of an example method of performing a read procedure according to some embodiments of the present disclosure.

FIG. 6 is a flow diagram of an example method 600 of performing a read procedure according to some embodiments of the present disclosure. In some embodiments, the method 600 may be performed by the system 100 and/or the system 500 described above with reference to FIGS. 1 and 5. However, the present disclosure is not limited thereto, and the operations shown in the method 600 may be performed by any suitable one of the components and elements or any suitable combination of the components and elements of those of the one or more example embodiments described above. Further, the present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method 600 may include fewer or additional operations.

Referring to FIG. 6, at operation 602, an LLC (e.g., the LLC 108) requests data from a memory controller (e.g., the memory controller 110 or 501). In some embodiments, the LLC requests the data from the memory controller in response to receiving, from a CPU (e.g., the CPU 102), a command to read the data (e.g., an instruction including an indication of a read operation and a memory address associated with the data). In some embodiments, the LLC requests the data from the memory controller by sending (e.g., via the read queue 206) the read command to the memory controller. In some embodiments, the read command includes a memory address at which the data is stored in a primary memory.

At operation 604, in response to receiving the read command from the LLC, the memory controller reads the data from the primary memory (e.g., the primary memory 116). In some embodiments, the memory controller reads (e.g., receives) the data from the primary memory via a first memory interface, such as the memory interface 124.

At operation 606 (which may be concurrently performed with or at least temporally overlapped with operation 604), in response to receiving the request to read the data from the LLC, the memory controller requests the corresponding code from the code cache (e.g., the code cache 112). The corresponding code is the code that was generated based on the data when the data was stored, such as described above with reference to operation 304 of FIG. 3.

At operation 608, the memory controller determines whether there is an code cache hit by determining whether the corresponding code is present in the code cache or is absent from the code cache.

At operation 610, in accordance with a determination that there is an code cache hit (e.g., the code is present in the code cache), the memory controller reads the code from the code cache.

At operation 612, in accordance with a determination that there is not an code cache hit, or in other words, a cache miss (e.g., the code is absent from the code cache), the memory controller reads (e.g., via the interface controller 114) the code from secondary memory, such as the secondary memory 120. In some embodiments, the memory controller reads the code from the secondary memory via a second memory interface different from the first memory interface, such as the second memory interface 126.

At operation 614, in accordance with the determination that there is not an code cache hit (e.g., the code is absent from the code cache), and after reading (e.g., via the interface controller 114) the code from the secondary memory, the memory controller writes the code to the code cache. For example, the memory controller writes the code in the code cache before, concurrently, or subsequently with the error detection and/or correction procedures described in more detail below.

At operation 616, after reading the data from the primary memory, the memory controller determines whether the code has been read (e.g., whether the code has been read from the code cache or from the secondary memory, and is available for performing the error detection and/or correction procedure).

In accordance with a determination at operation 616 that the code has not yet been read (e.g., NO at operation 616), at operation 618, the memory controller (e.g., the error checking and forwarding logic 504 of the memory controller 501) returns the data read at operation 604 with an indication that the data is speculative. The memory controller then waits until the code has been read (e.g., from the secondary memory 120 or the code cache 112) to proceed to operation 620.

In accordance with a determination at operation 616 that the code has been read (or after performing operation 618 and waiting for the code to be read), at operation 620, the memory controller performs error detection and/or correction based on the data read from the primary memory and the corresponding code that was read from either the code cache (e.g., at operation 610) or the secondary memory (e.g., at operation 612). For example, error checking logic 210 of the memory controller performs an error detection and/or correction procedure based on the data and the corresponding code.

At operation 622, the memory controller determines whether an error is detected during the error detection and/or correction performed at operation 620. For example, the error checking logic 210 of the memory controller determines whether an error is detected during the error detection and/or correction. In some embodiments, in accordance with a determination that a correctable error is detected (e.g., YES at operation 622), the error checking logic corrects the data and outputs corrected data. In some embodiments, in accordance with a determination that an uncorrectable error is detected, the error checking logic outputs an error indicator or may return the data with an error mark (e.g., an error flag or bit set to true).

In accordance with a determination that an error is not detected at operation 622 (e.g., the data that was read from the primary memory at operation 604 is correct and is not erroneous), at operation 624, the memory controller returns a first reliability mark (e.g., a reliability mark indicating that the data returned at operation 618 is correct, as described above with reference to FIG. 5), and/or returns the data that was read from the primary memory at operation 604 (e.g., if operation 618 was not performed because the code was determined to be available at operation 616). For example, the memory controller may return the data and/or a first reliability mark by writing the data and/or the first reliability mark to the response queue 214 or to the LLC 108 (optionally, via a multiplexer such as the multiplexer 216).

In accordance with a determination that an error is detected at operation 622 (e.g., the data read from the primary memory at operation 604 is incorrect or erroneous), at operation 626, the memory controller returns a second reliability mark (e.g., a reliability mark indicating that the data returned at operation 618 was erroneous, as described with reference to FIG. 5), or returns an error code (e.g., if operation 618 was not performed because the code was determined to be available at operation 616 and if an uncorrectable error was detected at operation 620), or returns corrected data (e.g., if operation 618 was not performed because the code was determined to be available at operation 616 and if a correctable error was detected at operation 620). For example, the memory controller may return the second reliability mark, error code, and/or corrected data by writing the second reliability mark, error code, and/or corrected data to the response queue 214 or to the LLC 108 (optionally, via a multiplexer such as the multiplexer 216).

FIG. 7 is a flow diagram of an example method 700 of performing a read procedure according to some embodiments of the present disclosure. In some embodiments, the operations of FIG. 7 may be performed by a CPU that includes a load-store queue and a reorder buffer, such as the CPU 102 described above with reference to FIG. 1. However, the present disclosure is not limited thereto, and the operations shown in the method 700 may be performed by any suitable one of the components and elements or any suitable combination of the components and elements of those of the one or more example embodiments described above. Further, the present disclosure is not limited to the sequence or number of the operations of the method 700 shown in FIG. 7, and can be altered into any desired sequence or number of operations as recognized by a person having ordinary skill in the art. For example, in some embodiments, the order may vary, or the method 700 may include fewer or additional operations.

Referring to FIG. 7, at operation 702, a CPU receives speculative data, and stores the speculative data in an entry of a load-store queue (e.g., the load-store queue 104). For example, the CPU receives, from a memory controller (e.g., the memory controller 110 or 501), data and an indication that the data is speculative (e.g., as described above with reference to FIG. 6), and stores the data in an entry of the load-store queue.

At operation 704, the CPU sets a speculative bit associated with the load-store queue entry with the data stored at operation 702 (e.g., a speculative bit associated with the data received at operation 702). For example, the CPU sets the speculative bit in the load-store queue entry to a first value (e.g., "1" or another value) based on receiving the indication that the data is speculative from the memory controller. In some embodiments, the speculative bit is included in the load-store queue entry with the data. In some embodiments, the speculative bit is stored in the load-store queue separately from the load-store queue entry with the data.

At operation 706, the CPU receives a reliability mark associated with the data received at operation 702. For example, the CPU receives the reliability mark from the memory controller, such as by receiving the first reliability mark or the second reliability mark described above with reference to FIG. 6. The reliability mark indicates whether the data received at operation 702 was correct or erroneous.

At operation 708, the CPU determines whether the data stored at operation 702 is error free (e.g., whether the data is correct or erroneous). In some embodiments, the CPU determines whether the data stored at operation 702 is correct or erroneous based on the reliability mark received at operation 706. For example, if the CPU receives the first reliability mark indicating that the data is correct, the CPU determines, based on the first reliability mark, that the data is correct. If the CPU receives the second reliability mark indicating that the data is erroneous, the CPU determines, based on the second reliability mark, that the data is erroneous.

In accordance with a determination that the data is error free (e.g., the data is correct), at operation 710, the CPU unsets the speculative bit associated with the load-store queue entry stored at operation 702 to indicate that the data is no longer speculative. For example, the CPU changes a value of the speculative bit from a first value to a second value to indicate that the data is no longer speculative, such as by changing the value from "1" to "0" or from "0" to "1." In some examples, the CPU commits the data (e.g., makes the data architecturally visible, such as by storing the data in a register or memory) based on a determination that the speculative bit indicates that the data is not speculative.

In accordance with a determination that the data is not error free (e.g., the data is erroneous), at operation 712, the CPU performs a misspeculation (recovery) procedure (e.g., a typical misspeculation or recovery procedure as known to those having ordinary skill in the art), for example, by backing out the load (e.g., the read command for reading the data received at operation 702) and subsequent instructions in the reorder buffer. For example, the CPU performs a similar recovery procedure as that performed when the CPU speculatively executes a branch (e.g., by predicting which path of a conditional branch instruction will ultimately be taken) in the case when the branch is subsequently not selected. For example, the CPU removes the read instruction from the reorder buffer along with any following (e.g., subsequent) instructions that use the results of the read instruction, and discards the results of following instructions without committing them.

FIG. 8 is a flow diagram of a method 800 of performing a read procedure according to some embodiments of the present disclosure. The method 800 may be performed by a memory controller (e.g., the memory controller 110, 201, and/or 501), or by a system that includes a memory controller (e.g., the system 100, 200, and/or 500, or the subsystem or device 123). For example, a memory controller may be configured to perform the method 800 by executing instructions that perform method 800 and/or using programmable or non-programmable hardware that is configured to perform method 800. However, the present disclosure is not limited thereto, and the operations shown in the method 800 may be performed by any suitable one of the components and elements or any suitable combination of the components and elements of those of the one or more example embodiments described above. Further, the present disclosure is not limited to the sequence or number of the operations of the method 800 shown in FIG. 8, and can be altered into any desired sequence or number of operations as recognized by a person having ordinary skill in the art. For example, in some embodiments, the order may vary, or the method 800 may include fewer or additional operations.

Referring to FIG. 8, at operation 802, a memory controller receives a read command to read requested data from a location (e.g., a memory address or other type of location) in primary memory. For example, the memory controller receives the read command from an LLC (e.g., the LLC 108) or from a CPU (e.g., the CPU 102). In some embodiments, the read command to read the data includes a memory address associated with the data, such as a memory address at which the data is stored in the primary memory (e.g., in the memory chip 118 of the primary memory 116).

At operation 804, the memory controller reads first data stored in the location from the primary memory. For example, in response to receiving the read command to read the data at operation 802, the memory controller transmits, a read request that includes the memory address associated with the requested data to, and receives first data from the primary memory. The first data may be data that is stored at the memory address. In some embodiments, the memory controller reads the data from the primary memory using a first memory interface (e.g., the first memory interface 124).

At operation 806, the memory controller reads a code corresponding to the requested data associated with the read command from a code cache or from secondary memory. For example, the memory controller uses the memory address associated with the data to retrieve a corresponding code from the code cache (e.g., if the ED code is present in the code cache), or from the secondary memory (e.g., if the code is absent from the code cache). For example, in response to receiving the read command to read the requested data at operation 802, and in accordance with a determination that the code is absent from the code cache (e.g., on a cache miss), the memory controller transmits a read request that includes the memory address associated with the data to the secondary memory, and receives the corresponding code from the secondary memory (e.g., via a second interface). In some embodiments, the secondary memory or code cache uses the memory address associated with the data to look up the corresponding code.

At operation 808, the memory controller performs error detection and/or correction based on the first data and the code. In some embodiments, the memory controller performs an error detection and correction procedure, such as an ECC procedure, that detects, and in some cases corrects, errors (e.g., 1-bit errors, 2-bit errors, or other errors) in the first data. In some embodiments, the memory controller performs an error detection procedure, such as a MAC procedure, that detects errors, but does not correct the detected errors. In some embodiments, if the error detection and/or correction detects that the first data is correct, the error detection and/or correction outputs the first data and/or outputs an indication that the first data is correct. In some embodiments, if the error detection and/or correction detects an uncorrectable error in the first data (e.g., an error that the error detection and/or correction cannot correct), the error detection and/or correction outputs an error indicator indicating that the first data is erroneous. In some embodiments, if the error detection and/or correction detects a correctable error in the first data (e.g., an error that the error detection and/or correction can correct), the error detection and/or correction corrects the first data to generate corrected data and outputs the corrected data.

At operation 810, the memory controller selects second data based on a result of the error detection and/or correction. In some embodiments, the memory controller selects the second data using a multiplexer, such as the multiplexer 216. In some embodiments, in accordance with a determination that the result of the error detection and/or correction includes an indication that the first data is correct, the memory controller selects the first data as the second data (e.g., the memory controller outputs the data that was read from the primary memory). In some embodiments, in accordance with a determination that the output of the error detection and/or correction includes corrected data, the memory controller selects the corrected data as the second data (e.g., the memory controller outputs corrected data). In some embodiments, in accordance with a determination that the output of the error detection and/or correction includes an error indicator, the memory controller selects the error indicator as the second data (e.g., the memory controller outputs the error indicator).

At operation 812, the memory controller outputs the second data for the requested data (e.g., the memory controller outputs the second data in response to receiving the command to read the requested data). In some embodiments, the memory controller outputs the second data by writing the second data to a response queue (e.g., the response queue 214) or to an LLC (e.g., the LLC 108).

Figure 9:
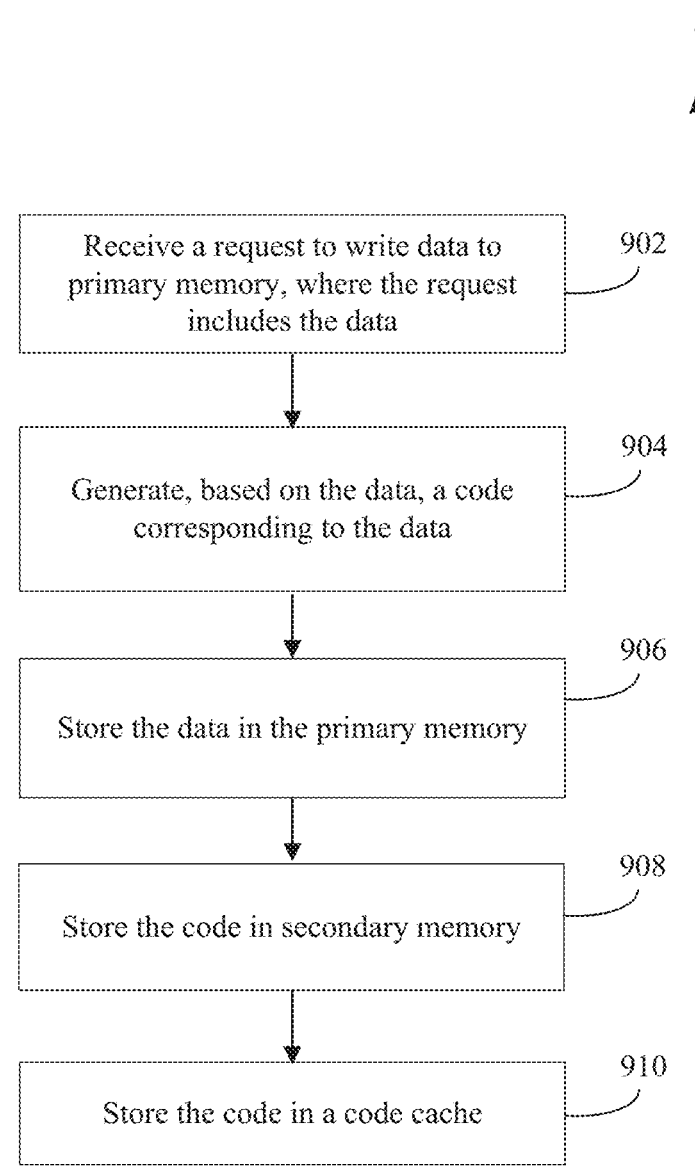
FIG. 9 is a flow diagram of a method of performing a write procedure according to some embodiments of the present disclosure.

FIG. 9 is a flow diagram of a method of performing a write procedure according to some embodiments of the present disclosure. The method 900 may be performed by a memory controller (e.g., the memory controller 110, 201, and/or 501), or by a system that includes a memory controller (e.g., the system 100, 200, and/or 500, or the subsystem 123). For example, a memory controller may be configured to perform the method 900 by executing instructions that perform method 900 and/or using programmable or non-programmable hardware that is configured to perform the method 900. However, the present disclosure is not limited thereto, and the operations shown in the method 900 may be performed by any suitable one of the components and elements or any suitable combination of the components and elements of those of the one or more example embodiments described above. Further, the present disclosure is not limited to the sequence or number of the operations of the method 900 shown in FIG. 9, and can be altered into any desired sequence or number of operations as recognized by a person having ordinary skill in the art. For example, in some embodiments, the order may vary, or the method 900 may include fewer or additional operations.

Referring to FIG. 9, at operation 902, a memory controller receives a request to write data to the primary memory. In some embodiments, the request includes the data. For example, the memory controller receives the request from an LLC (e.g., the LLC 108) or from a CPU (e.g., the CPU 102). In some embodiments, the request to write the data includes the data.

At operation 904, the memory controller generates, based on the data, a code corresponding to the data. For example, the code generator 202 of the memory controller generates the code by encoding the data (optionally, with additional bits) using an ECC algorithm or another suitable kind of algorithm.

At operation 906, the memory controller stores the data in the primary memory (e.g., the primary memory 116). In some embodiments, the memory controller stores the data in the primary memory using a first memory interface (e.g., the first memory interface 124).

At operation 908, the memory controller stores the code in the secondary memory (e.g., the secondary memory 120). In some embodiments, the memory controller stores the code in the secondary memory using a second memory interface (e.g., the second memory interface 126) and/or an interface controller (e.g., the interface controller 114). In some embodiments, the memory controller stores the code in the secondary memory with a memory address associated with the data stored in the primary memory at operation 906 (e.g., a memory address at which the data was stored in the primary memory) to enable subsequent retrieval of the code from the secondary memory when the data is retrieved from the primary memory.

At operation 910, the memory controller stores the code in the code cache (e.g., the code cache 112). In some embodiments, the memory controller stores the code in the code cache with a memory address associated with the data stored in the primary memory at operation 906 (e.g., a memory address at which the data was stored in the primary memory) to enable subsequent retrieval of the code from the code cache when the data is retrieved from the primary memory.

According to one or more embodiments of the present disclosure described above, when a memory controller stores data in primary memory, the memory controller generates and stores a corresponding code in secondary memory that can be subsequently used to verify the data when it is read back from the primary memory. To reduce the frequency of additional read latencies associated with retrieving the code from the secondary memory, in some embodiments, the memory controller also stores the code in a code cache on the memory controller. In some embodiments, the memory controller mitigates the read latency associated with reading the code from the secondary memory (e.g., when there is a code cache miss) by forwarding the data that is read from the primary memory with an indication that the data is speculative, before completing the error detection and/or correction procedure. In this case, the CPU may be enabled to continue to speculatively execute instructions that rely on the forwarded data. When the error detection and/or correction procedure is completed, the memory controller outputs a reliability mark that indicates whether the previously forwarded data was correct or erroneous. If the data was erroneous, the CPU backs out (e.g., reverses) the read operation associated with the data and any speculatively executed instructions that relied on the data.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

Any of the functionality described herein, including any of the functionality that may be implemented with the system 100, 200, and 500, the subsystem 123, the CPU 102, the memory controller 110, the primary memory 116, and/or the secondary memory 120, as well as any of the functionality described above with respect to the embodiments illustrated in FIGS. 1, 2, and 5, may be implemented with any suitable hardware, software, firmware, or any suitable combinations thereof including, for example, hardware and/ or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, CPLDs, FPGAS, ASICs, CPUs including CISC processors and/or RISC processors, GPUs, NPUs, TPUs, DPUs, and/or the like, executing instructions stored in any type of memory. In some embodiments, one or more components may be implemented as a system-on-chip (SOC).

Any of the CPUs 102 and/or any subsystems or devices 123 disclosed herein that may implement any of the functionality described herein relating to intermediary formats and/or languages may be implemented with any component or combination of components including one or more of a client device, a server, a storage node, a CPU, a personal computer, a tablet computer, a smartphone, and/or the like.

Any of the computational devices disclosed herein including the CPU 102, the memory controller 110, 201, and/or 501, and/or the like, may be implemented in any form factor such as 3.5 inch, 2.5 inch, 1.8 inch, M.2, Enterprise and Data Center Standard Form Factor (EDSFF), NF1, and/or the like, using any connector configuration such as Serial ATA (SATA), Small Computer System Interface (SCSI), Serial Attached SCSI (SAS), U.2, and/or the like. Any of the computational devices disclosed herein may be implemented entirely or partially with, and/or used in connection with, a server chassis, server rack, dataroom, datacenter, edge datacenter, mobile edge datacenter, and/or any combinations thereof.

Any of the communication connections and/or communication interfaces disclosed herein including interfaces 124 and/or 126 may be implemented with one or more interconnects, one or more networks, a network of networks (e.g., the internet), and/or the like, or a combination thereof, using any type of interface and/or protocol. Examples may include Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, Infini-Band, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), and/or the like, Advanced extensible Interface (AXI), any generation of wireless network including 2G, 3G, 4G, 5G, 6G, and/or the like, any generation of Wi-Fi, Bluetooth, near-field communication (NFC), and/or the like, or any combination thereof.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program commands and interacting with other system components for performing the various functionalities described herein. The computer program commands are stored in a memory which may be implemented in a computing device using a standard memory device, such as, for example, a random access memory (RAM). The computer program commands may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system, comprising:
a code cache; and
a memory controller connected to the code cache, and configured to:
  receive a read command to read requested data from a location in primary memory connected to the memory controller over a first interface;
  read first data stored in the location from the primary memory;
  read a code corresponding to the requested data associated with the read command from secondary memory connected to the memory controller over a second interface different from the first interface;
  store the code in the code cache;
  perform error detection and/or correction based on the first data and the code;
  select second data based on a result of the error detection and/or correction; and
  output the second data for the requested data.

2. The system of claim 1, wherein the memory controller is further configured to:
determine, based on the result of the error detection and/or correction, that the first data is erroneous; and
in accordance with the determination that the first data is erroneous, select the second data by selecting third data as the second data, the third data being different from the first data.

3. The system of claim 2, wherein the third data comprises corrected data generated by the error detection and/or correction based on the first data and the code.

4. The system of claim 2, wherein the third data comprises an error indicator indicating that the first data is erroneous.

5. The system of claim 2, wherein the memory controller is further configured to output, for the requested data, the first data and an indication that the first data is speculative before completing the error detection and/or correction, and
  wherein the third data comprises a reliability mark indicating whether the first data is correct or erroneous.

6. The system of claim 5 further comprising a processor communicably connected to the memory controller, and configured to:
  receive, from the memory controller, the first data and the indication that the first data is speculative;
  store, in a load-store queue, the first data and a value of a speculative bit associated with the first data, the value of the speculative bit corresponding to the indication that the first data is speculative;

receive, from the memory controller, the third data including the reliability mark;
  in accordance with a determination that the reliability mark is a first reliability mark indicating that the first data is correct, change the value of the speculative bit to indicate that the first data is correct; and
  in accordance with a determination that the reliability mark is a second reliability mark indicating that the first data is erroneous, perform a misspeculation procedure associated with the command to read the requested data.

7. The system of claim 1, wherein the memory controller is further configured to:
determine, based on the result of the error detection and/or correction, that the first data is correct; and
in accordance with the determination that the first data is correct, select the second data by selecting the first data as the second data.

8. The system of claim 1, wherein the second interface comprises a cache-coherent interconnect.

9. The system of claim 1, wherein the code comprises an error correction code (ECC) or a message authentication code (MAC).

10. A system comprising:
a code cache; and
a memory controller connected to the code cache, and configured to:
  receive a request to write data to a primary memory connected to the memory controller over a first interface, wherein the request comprises the data;
  generate, based on the data, a code corresponding to the data;
  store the data in the primary memory;
  store the code in secondary memory connected to the memory controller over a second interface; and
  store the code in the code cache such that the code is stored in both the secondary memory and the code cache.

11. The system of claim 10, wherein the code comprises an error correction code (ECC) or a message authentication code (MAC).

12. The system of claim 10, wherein the second interface comprises a cache-coherent interconnect.

13. The system of claim 10, wherein the memory controller is further configured to:
store, with the code in the code cache, an indication of a location of the data in the primary memory.

14. The system of claim 10, further comprising:
a processor connected to a last-level cache (LLC), the LLC connected to the memory controller,
wherein the memory controller is configured to receive the request via the LLC.

15. The system of claim 10, further comprising:
the primary memory; and
the secondary memory.

16. A system, comprising:
a code cache; and
a memory controller connected to the code cache, wherein the memory controller comprises:
  an error detection (ED) code generator configured to generate codes based on data associated with requests to write the data received by the memory controller; and
  error checking logic configured to detect, based on the codes generated by the code generator and stored in the code cache, errors in data read from primary memory by the memory controller during read instructions, wherein the memory controller is configured to store the codes in the code cache and in a secondary memory different from the primary memory such that the codes are stored in both the code cache and the secondary memory.

17. The system of claim 16, further comprising:

a last-level cache (LLC) connected with the memory controller; and a processor connected with the LLC, wherein the processor comprises a load-store queue for storing instructions in an order in which the instructions will be committed, and a reorder buffer configured to store instructions that are speculatively executed by the processor, wherein the processor is configured to read and write memory access instructions to the LLC.

18. The system of claim 16, wherein the memory controller is connected to the primary memory via a first interface, and connected to secondary memory via a second interface different from the first interface.

19. The system of claim 18, wherein the error checking logic is configured to detect the errors in the data read from the primary memory based on codes retrieved from the code cache or the secondary memory.

20. The system of claim 18, wherein the first interface comprises an interface controller connected to the memory controller.

* * * * *